(12) United States Patent
Liu

(10) Patent No.: US 8,515,502 B2
(45) Date of Patent: Aug. 20, 2013

(54) APPARATUS AND METHOD FOR STATE DETECTION AND TERMINAL EQUIPMENT

(75) Inventor: Yinong Liu, Beijing (CN)

(73) Assignees: Sony Corporation, Toyko (JP); Sony Mobile Communications AB, Lund (SE)

( * ) Notice: Subject to any disclaimer, the term of this patent is extended or adjusted under 35 U.S.C. 154(b) by 44 days.

(21) Appl. No.: 13/554,377

(22) Filed: Jul. 20, 2012

(65) Prior Publication Data

US 2013/0035140 A1    Feb. 7, 2013

(30) Foreign Application Priority Data

Aug. 4, 2011   (CN) .......................... 2011 1 0222426

(51) Int. Cl.
*H04M 1/00*   (2006.01)
*H04B 1/38*   (2006.01)

(52) U.S. Cl.
USPC ...................................... 455/575.1; 455/566

(58) Field of Classification Search
USPC .............. 455/575.1–575.7, 550.1, 90.3, 66.1, 455/556.2, 566, 67.11, 90.2
See application file for complete search history.

(56) References Cited

U.S. PATENT DOCUMENTS

2002/0025837 A1* 2/2002 Levy .............................. 455/566
2011/0065480 A1* 3/2011 Kim et al. ..................... 455/566

FOREIGN PATENT DOCUMENTS

EP           2 280 527 A1     2/2011
WO      2009/134289 A1    11/2009

OTHER PUBLICATIONS

Extended European Search Report for corresponding European Application No. 12177939.1 dated Nov. 8, 2012.

* cited by examiner

*Primary Examiner* — Charles Appiah
*Assistant Examiner* — Emem Stephen
(74) *Attorney, Agent, or Firm* — Renner, Otto, Boisselle & Sklar, LLP

(57) ABSTRACT

The embodiments of the present invention provide an apparatus and method for state detection and terminal equipment. The apparatus for state detection includes: capacitive touch sensors arranged in the first cover of the terminal equipment a metal structure arranged in the second cover of the terminal equipment and grounded, the capacitive touch sensors being triggered by the metal structure, such that the capacitance of the capacitive touch sensors is changed and a state determiner to determine that the second cover is opened or closed relative to the first cover according to the changed capacitance of the capacitive touch sensors. The opening and closing of the terminal equipment may be detected without the participation of the user, thereby providing a better user experience with high precision of detection.

20 Claims, 6 Drawing Sheets

APPARATUS AND METHOD FOR STATE DETECTION AND TERMINAL EQUIPMENT

TECHNICAL FIELD

The present invention relates to the field of electronics, and in particular to an apparatus and method for state detection and terminal equipment.

BACKGROUND ART

Currently, smart terminal equipment is used more and more, including various slide-type mobile phones, and clamshell-type mobile phones, etc. How to detect an opened state or a closed state of terminal equipment must be taken into consideration in the design of smart terminal equipment.

Qwerty keyboard layout is used more and more in the smart terminal equipment, and many touch keys may be provided above the Qwerty, such as a multi-media control key (play, forward, and backward, etc.), and a volume control key, etc.

SUMMARY OF THE INVENTION

It has been found that in the prior art, how to detect an opened state or a closed state of terminal equipment needs participation of a user. For example, when using a smart mobile phone, the user has to press down the locking key or the unlocking key, which fails to provide a better experience to the user. Furthermore, in the process of detection, interferences are frequently encountered and lead to reduced detection precision.

The embodiments of the present invention provide an apparatus and method for state detection and terminal equipment, with the object being to detect an opened state or a closed state of terminal equipment without the participation of a user, thereby providing a better experience to the user.

According to an aspect of the embodiments of the present invention, there is provided an apparatus for state detection, applicable to terminal equipment having a first cover and a second cover, the apparatus for state detection includes:

capacitive touch sensors arranged in the first cover of the terminal equipment;

a metal structure arranged in the second cover of the terminal equipment and grounded, the capacitive touch sensors being triggered by the metal structure, such that the capacitance of the capacitive touch sensors is changed; and a state determiner to determine that the second cover is opened or closed relative to the first cover according to the changed capacitance of the capacitive touch sensors.

According to another aspect of the embodiments of the present invention, the terminal equipment is a slide-type mobile terminal, and the capacitive touch sensors are arranged at the upper side of the first cover.

According to a further aspect of the embodiments of the present invention, the terminal equipment is a clamshell-type mobile terminal, and the capacitive touch sensors are arranged at the lower side of the first cover.

According to still another aspect of the embodiments of the present invention, the metal structure is positioned above the capacitive touch sensor when the second cover is closed relative to the first cover; or the metal structure is positioned above the capacitive touch sensor when the second cover is opened relative to the first cover.

According to still another aspect of the embodiments of the present invention, the apparatus for state detection further includes:

touch keys arranged on the surface of the first cover and connected to the capacitive touch sensors, the capacitive touch sensors being triggered by the contact of the touch keys and the metal structure, such that the capacitance of the capacitive touch sensors is changed.

According to still another aspect of the embodiments of the present invention, the touch keys and the capacitive touch sensors are multiple, and the touch keys are spaced at intervals on the surface of the first cover.

According to still another aspect of the embodiments of the present invention, there is provided terminal equipment, including the apparatus for state detection as stated above.

According to still another aspect of the embodiments of the present invention, there is provided a method for state detection, applicable to terminal equipment having a first cover and a second cover, the method for state detection includes:

a cover moving step: moving the second cover of the terminal equipment relative to the first cover, wherein capacitive touch sensors are arranged in the first cover, and a grounded metal structure is arranged in the second cover;

a capacitance changing step: triggering the capacitive touch sensors by the metal structure, such that the capacitance of the capacitive touch sensors is changed; and a state determining step: determining that the second cover is opened or closed relative to the first cover according to the changed capacitance of the capacitive touch sensors.

According to still another aspect of the embodiments of the present invention, the capacitance changing step includes: triggering the capacitive touch sensors by the contact of touch keys arranged on the surface of the first cover and the metal structure, such that the capacitance of the capacitive touch sensors is changed.

According to still another aspect of the embodiments of the present invention, multiple touch keys and the capacitive touch sensors are provided, and the touch keys are interleaved on the surface of the first cover; and the state determining step includes: determining that the second cover is opened or closed relative to the first cover when part or all of the touch keys are in contact with the metal structure.

Advantages of the present invention exists in that the opened state or the closed state of the terminal equipment may be detected by the capacitive touch sensors without the participation of the user, thereby providing a better user experience with high precision of detection.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale; emphasis instead is being placed upon clearly illustrating the principles of the present invention. To facilitate illustration and to describe some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

Drawings are included to provide further understanding of the present invention, which constitute a part of the specification and illustrate the preferred embodiments of the present invention, and are used for setting forth the principles of the present invention together with the description. The same element is represented with the same reference number throughout the drawings. In some instances, different reference numerals designate the same element in different drawing figures. For example, a metal structure 704 in FIG. 7 and a metal structure 102 in FIG. 1.

In the drawings.

DETAILED DESCRIPTION OF THE INVENTION

The interchangeable terms "electronic apparatus" and "electronic device" include portable radio communication apparatus. The term "portable radio communication apparatus", which hereinafter is referred to as a "mobile terminal", "portable electronic device", or "portable communication device", includes all apparatuses such as mobile telephones, pagers, communicators, electronic organizers, personal digital assistants (PDAs), smartphones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatus having the function of photographing and sound recording.

The embodiments of the present invention provide an apparatus for state detection, applicable to terminal equipment having a first cover and a second cover, and the terminal equipment may be a slide-type mobile terminal, a clamshell-type mobile terminal, or a notebook computer, etc. It should be noted that the following explanation is given taking a mobile terminal as an example only, but this invention is not only limited thereto.

Figure 1:
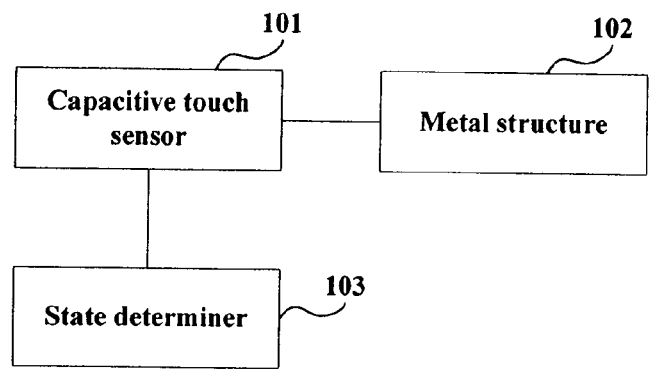
FIG. 1 is a schematic diagram showing the composition of the apparatus for state detection of the embodiments of the present invention.

FIG. 1 is a schematic diagram showing the composition of the apparatus for state detection of the embodiments of the present invention. As shown in FIG. 1, the apparatus for state detection includes capacitive touch sensors 101, a metal structure 102 and a state determiner 103.

The capacitive touch sensors 101 are arranged in the first cover (104 in FIG. 2) of the terminal equipment, the metal structure 102 is arranged in the second cover (105 in FIG. 2) and grounded, the capacitive touch sensors 101 are being triggered by the metal structure 102, such that the capacitance of the capacitive touch sensors 101 is changed; and the state determiner 103 determines that the second cover 105 is opened or closed relative to the first cover 104 according to the changed capacitance of the capacitive touch sensors 101.

Figure 2:
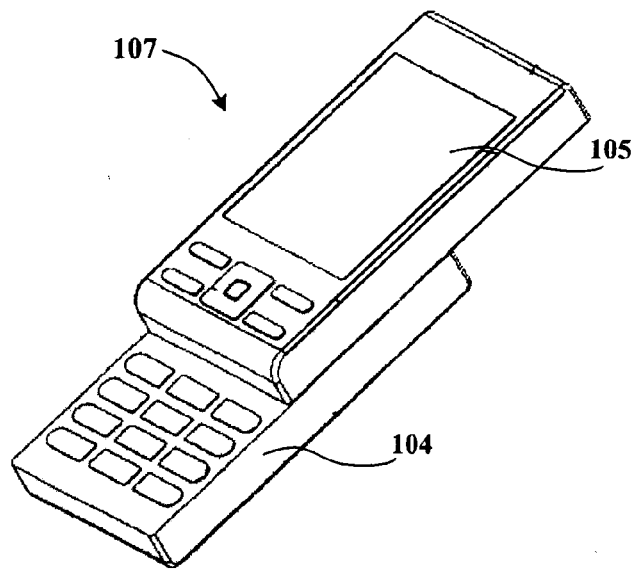
FIG. 2 is a schematic diagram showing the composition of the slide-type mobile terminal of the embodiments of the present invention.
Figure 3:
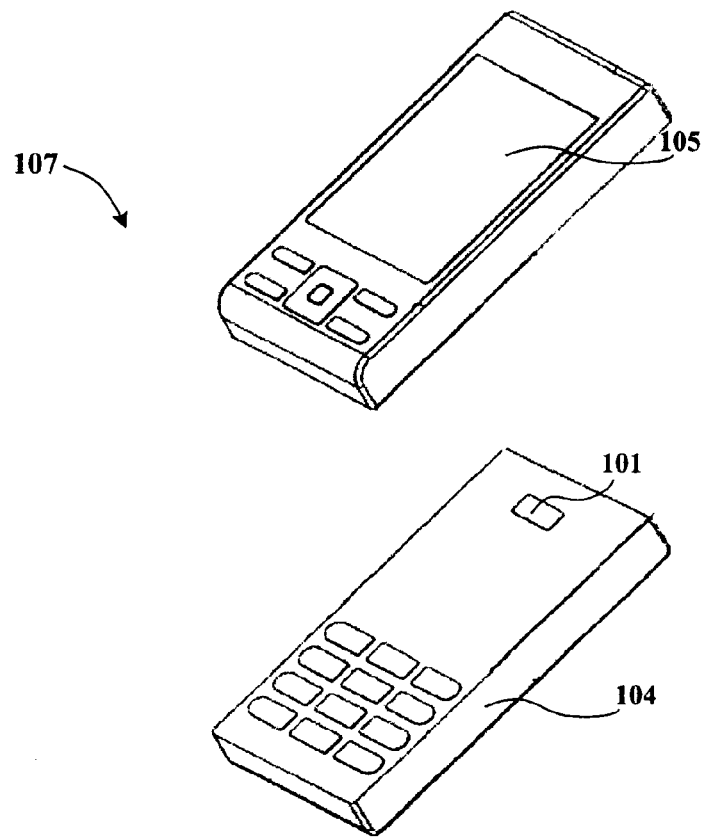
FIG. 3 is a perspective view of the slide-type mobile terminal of the embodiments of the present invention.
Figure 4:
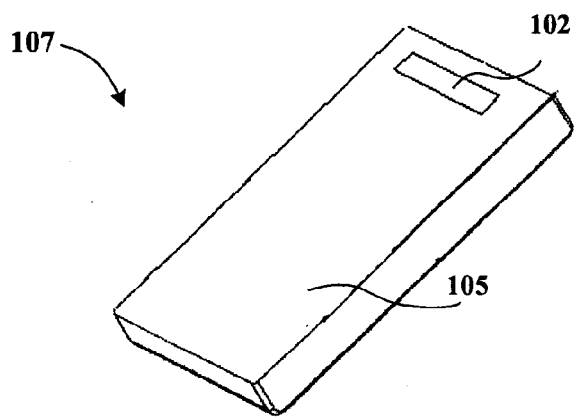
FIG. 4 is a rear view of a second cover of the slide-type mobile terminal of the embodiments of the present invention.

FIG. 2 is a schematic diagram showing the composition of the slide-type mobile terminal 107 of the embodiments of the present invention, FIG. 3 is a perspective view of the slide-type mobile terminal 107 of the embodiments of the present invention, and FIG. 4 is a rear view of a second cover of the slide-type mobile terminal 107 of the embodiments of the present invention.

In an embodiment, as shown FIGS. 3 and 4, the capacitive touch sensors 101 may be arranged at the upper side of the keyboard in the first cover 104, and the metal structure 102 may be a metal sheet having a certain length, which may be arranged at the upper side of the second cover 105, such that the metal structure 102 is positioned above the capacitive touch sensors 101 when the second cover 105 is closed relative to the first cover 104, that is, covering the capacitive touch sensors 101. At this time, the capacitance of the capacitive touch sensors 101 is changed under the effect of the grounded metal structure 102, for example, the capacitance is enlarged.

When the second cover 105 is opened relative to the first cover 104, the metal structure 102 is no longer positioned above the capacitive touch sensors 101. At this time, the capacitive touch sensors 101 are no longer affected by the metal structure 102, and their capacitance may restore to a predetermined capacitance. As to how the metal structure causes the capacitive touch sensors 101 to be changed, the prior art may be used, which shall not be described any further.

In this way, the state determiner 103 may determine that the second cover 105 is opened relative to the first cover 104 according to the change of the capacitance (for example, being changed from large to small) of the capacitive touch sensors 101; or may determine that the second cover 105 is closed relative to the first cover 104 according to the change of the capacitance (for example, being changed from small to large) of the capacitive touch sensors 101.

Figure 5:
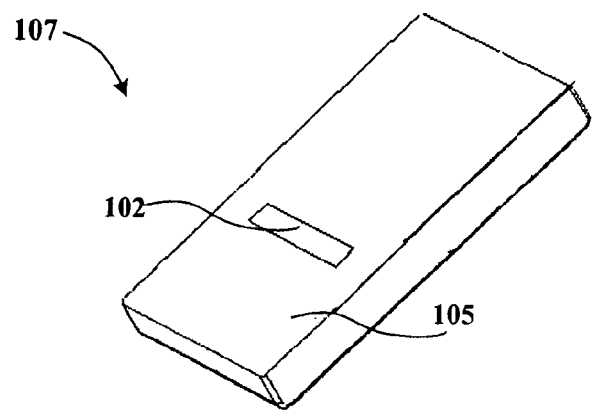
FIG. 5 is a rear view of another second cover of the slide-type mobile terminal of the embodiments of the present invention.

FIG. 5 is a rear view of another second cover of the slide-type mobile terminal 107 of the embodiments of the present invention. As shown FIGS. 3 and 5, in another embodiment, the capacitive touch sensors 101 may also be arranged at the upper side of the keyboard in the first cover 104, and the metal structure 102 may be arranged at the lower side of the second cover 105. In this way, when the second cover 105 is not moved relative to the first cover 104 and is in the closed state, the metal structure 102 and the capacitive touch sensors 101 are staggered which will not trigger the capacitive touch sensors 101. At this time, the capacitance of the capacitive touch sensors 101 may be the predetermined capacitance.

When the second cover 105 is moved relative to the first cover 104 and is in the opened state, the grounded metal structure 102 may be just positioned above the capacitive touch sensors 101, such that the capacitance of the capacitive touch sensors 101 is changed, generating larger capacitance which is different from the predetermined capacitance.

In this way, the state determiner 103 may determine that the second cover 105 is opened relative to the first cover 104 according to the change of the capacitance (for example, being changed from small to large) of the capacitive touch sensors 101; or may determine that the second cover 105 is closed relative to the first cover 104 according to the change of the capacitance (for example, being changed from large to small) of the capacitive touch sensors 101.

In this embodiment, as described above, the state determiner 103 may determine that the second cover 105 is opened or closed relative to the first cover 104 according to the change of the capacitance of the capacitive touch sensors 101. In specific implementation, the state determiner 103 may be integrated into a chip or an integrated circuit.

In this embodiment, the capacitive touch sensors 101 may be integrated into the first cover 104, and may be connected to a metal sheet, of which the capacitance being changed by the effect of the metal sheet and the metal structure 102; however, it is not limited thereto, and touch keys (e.g., see 601 in FIG. 6) may be arranged on the surface of the mobile terminal, triggering the capacitive touch sensors 101 via the touch keys.

In particular, the touch keys (e.g. see 601 in FIG. 6) may be arranged on the surface of the first cover 104 and connected to the capacitive touch sensors 101, and the capacitive touch sensors 101 are triggered via the touch keys, such that the capacitance of the capacitive touch sensors 101 is changed. Hence, the effect of the interference may be reduced, further improving the precision of the detection.

Figure 6:
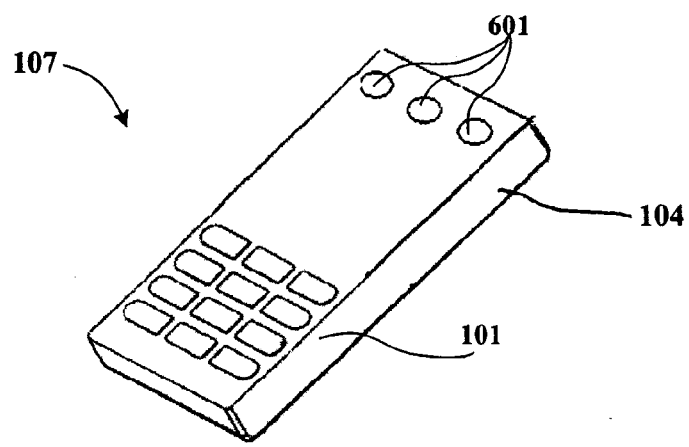
FIG. 6 is a schematic diagram of another first cover of the slide-type mobile terminal of the embodiments of the present invention.

FIG. 6 is a schematic diagram of another first cover 104 of the slide-type mobile terminal 107 of the embodiments of the present invention. As shown in FIG. 6, a plurality of touch keys 601 may be arranged on the surface of the first cover 104, spaced at intervals in the first cover 104, with certain spaces therebetween, so that they are not adjacent to each other. Each of the touch keys 601 may be connected (not shown) to one capacitive touch sensor or several touch keys may be connected (not shown) to one capacitive touch sensor. The above description is exemplary explanation of the touch keys; however, it is not limited thereto.

In implementation, whether the capacitance of the capacitive touch sensors 101 connected to the touch keys 601 is changed may be judged by these touch keys 601. If the capacitance of a capacitive touch sensor 101 is changed, it can be determined that the touch key 601 connected to this capacitive touch sensor 101 is contacted. Then, whether part or all of these touch keys are contacted may be judged, and when part or all of a plurality of touch keys 601 are contacted, it can be determined that the second cover (e.g., see 105 in FIG. 5) is opened or closed relative to the first cover 104.

For example, total five touch keys may be arranged, with each of the touch keys corresponding to one capacitive touch sensor 101. If it is judged that four of the five touch keys are contacted, it can be determined that the second cover (105 in FIG. 5) is opened relative to the first cover 104.

In implementation, software may be used to perform debounce filtering on the result of judgment, such that the result of the detection is more precise. For example, after the second cover (105 in FIG. 5) is opened relative to the first cover 104, if one of the touch keys 601 is touched by the user unintentionally, the capacitance of the corresponding capacitive touch sensor will be changed, and the state determiner 103 will not determine that the second cover 105 is closed relative to the first cover 104 and will take it as an interference to process, thereby improving the precision of the detection.

It should be noted that what is described above is only exemplary explanation of how to arrange the capacitive touch sensors 101 and the metal structure 102; however, it is not limited thereto, and particular manners or positions of arrangement may be determined as actually demanded.

For example, in FIG. 6, the touch keys 601 arranged at the upper side of the first cover 104 and may be covered by the second cover 105, thereby reducing the interference; however, it is not limited thereto, and in practice, multi-media control keys or volume control keys may be used as the touch keys of the present invention.

For example, when a volume control key is only touched, the original volume control function may be realized; and when all the functional touch keys (such as the forward, backward, and volume control keys) are touched, or when two functional touch keys with the largest distance therebetween are touched at the same time, it is determined that the terminal equipment is opened or closed. Therefore, the existing keys may be used, the space is saved and the cost is reduced and furthermore, the effect of the interference may be reduced.

Illustrative explanation of the apparatus for state detection is given in the above embodiments taking a slide-type mobile terminal as an example. However, the present invention is not limited to the slide-type mobile terminal. Following explanation is given taking a clamshell-type mobile terminal as an example.

Figure 7:
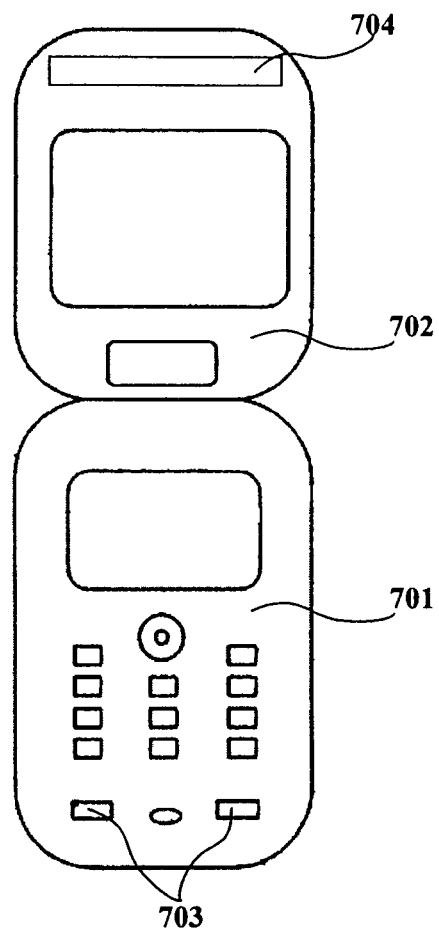
FIG. 7 is a schematic diagram showing the composition of the clamshell-type mobile terminal of the embodiments of the present invention.

FIG. 7 is a schematic diagram showing the composition of the clamshell-type mobile terminal of the embodiments of the present invention. As shown in FIG. 7, the mobile terminal includes a first cover 701 and a second cover 702. The apparatus for state detection includes: capacitive touch sensors (not shown), a metal structure 704 and a state determiner (not shown).

As shown in FIG. 7, the metal structure 704 is arranged on the second cover 702, and may be arranged on the upper side of the second cover 702. A plurality of touch keys 703 may be arranged at the lower side of the first cover 701 and connected to the capacitive touch sensors, with the capacitive touch sensors and the state determiner being integrated into the first cover 701.

When the second cover 702 is closed relative to the first cover 701, the metal structure 704 corresponds to the touch keys 703, and the capacitance of the capacitive touch sensors may be changed by the grounded metal structure 704 (for example, being changed from small to large); and when the second cover 702 is opened relative to the first cover 701, the metal structure 704 does not correspond to the touch keys 703 any longer, and the capacitance of the capacitive touch sensors may be changed by the grounded metal structure 704 (for example, being changed from large to small). In this way, the state determiner may detect that the second cover is opened or closed relative to the first cover.

It should be noted that FIGS. 2-7 are illustrative only, and the structure is not limited to those shown in these figures. In practice, particular structures of the terminal equipment may be determined as actually demanded.

It can be seen from the above embodiment that the opened state or the closed state of the terminal equipment may be detected by the capacitive touch sensors without the participation of the user, thereby providing a better user experience with high precision of detection.

Figure 8:
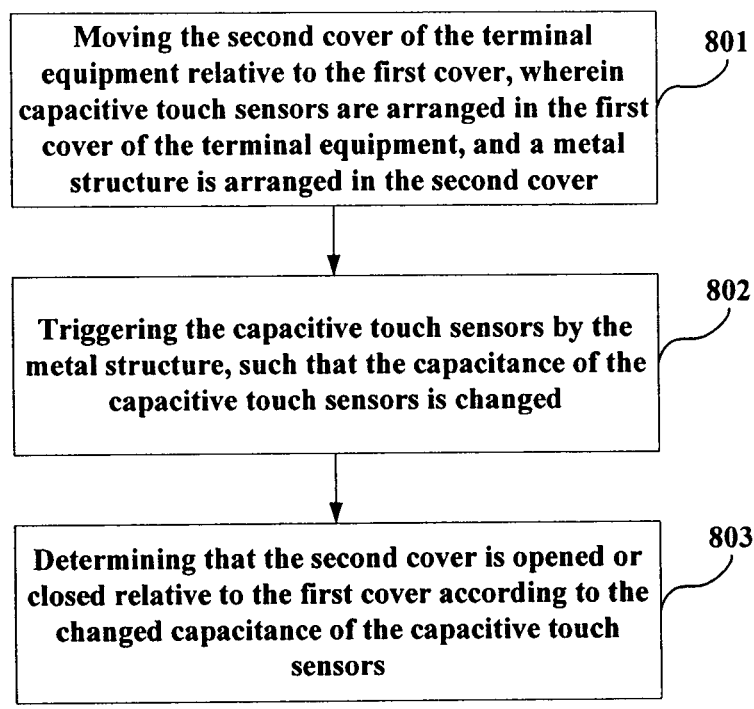
FIG. 8 is a flowchart of the method for state detection of the embodiments of the present invention.

The embodiments of the present invention further provide a method for state detection, applicable to terminal equipment having a first cover and a second cover. FIG. 8 is a flowchart of the method for state detection of the embodiments of the present invention. As shown in FIG. 8, the method for state detection includes:

a cover moving step 801: moving the second cover of the terminal equipment relative to the first cover, wherein capacitive touch sensors are arranged in the first cover of the terminal equipment, and a grounded metal structure is arranged in the second cover;

a capacitance changing step 802: triggering the capacitive touch sensors by the metal structure, such that the capacitance of the capacitive touch sensors is changed; and a state determining step 803: determining that the second cover is opened or closed relative to the first cover according to the changed capacitance of the capacitive touch sensors.

Moreover, in this embodiment, the capacitance changing step 802 includes: triggering the capacitive touch sensors by the contact of touch keys (e.g., see 601 and 703 in FIGS. 6 and 7, respectively) arranged on the surface of the first cover and the metal structure, such that the capacitance of the capacitive touch sensors is changed.

Moreover, in this embodiment, the touch keys and the capacitive touch sensors are multiple, and the touch keys are spaced at intervals on the surface of the first cover. Furthermore, the state determining step 803 specifically includes: determining that the second cover is opened or closed relative to the first cover when part or all of the touch keys are in contact with the metal structure.

It can be seen from the above embodiment that the opened state or closed state of the terminal equipment may be detected by the capacitive touch sensors without the participation of the user, thereby improving user experience with high precision of detection.

The embodiments of the present invention further provide terminal equipment, including the apparatus for state detection as stated above.

Figure 9:
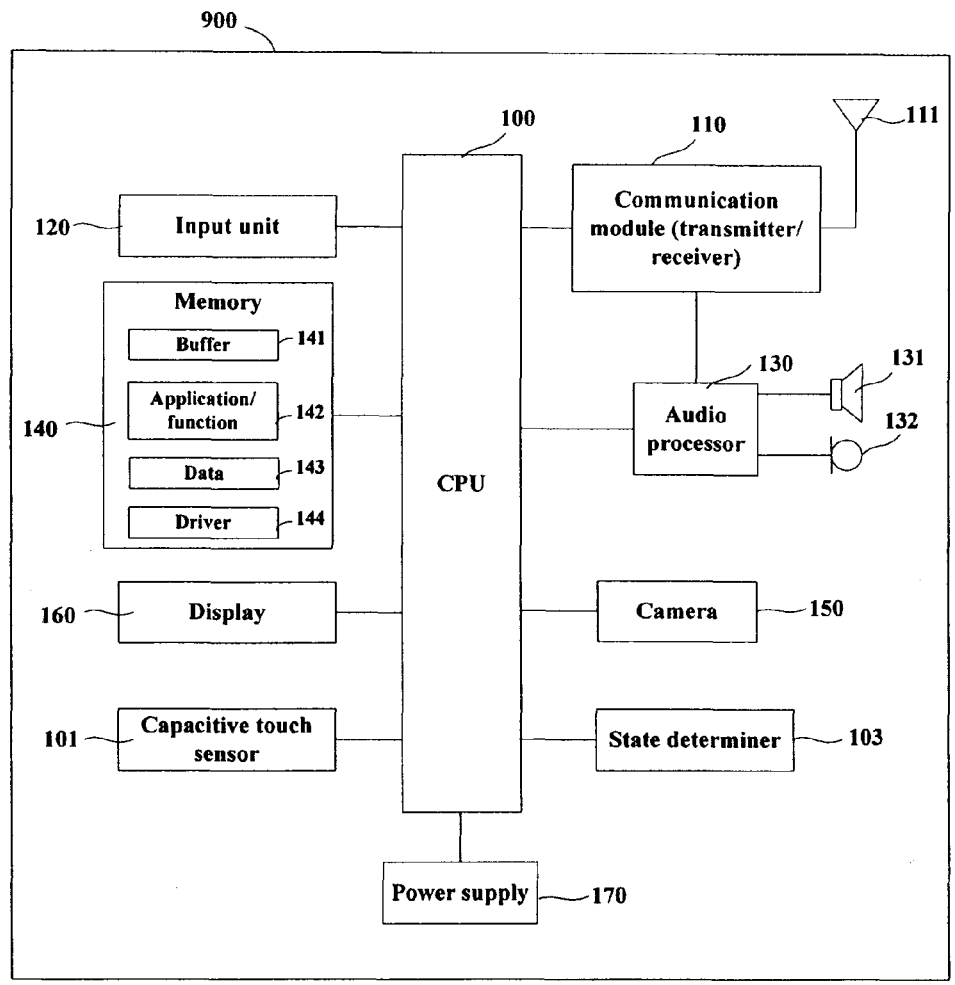
FIG. 9 is a block diagram of the systematic composition of the terminal equipment of the embodiments of the present invention.

FIG. 9 is a block diagram of the systematic composition of the terminal equipment 900 of the embodiments of the present invention, in which the above-described capacitive touch sensors 101 and the state determiner 103 are included, with the grounded metal structure 102 not shown is FIG. 9. Such a figure is illustrative only, and other types of structures may be used to supplement or replace this structure, so as to realize the telecommunications function or other functions.

As shown in FIG. 9, the terminal equipment 900 may further include a central processing unit 100, a communication module 110, an input unit 120, an audio processing unit 130, a memory 140, a camera 150, a display 160, and a power supply 170.

The capacitive touch sensors 101 and the state determiner 103 may be connected directly, may be connected via the central processing unit 100 shown in FIG. 9, and may also be integrated into the central processing unit 100.

The central processing unit 100 (sometimes referred to as a controller or control, which may include a microprocessor or other processor devices and/or logic devices) receives input and controls every component and operation of the terminal equipment 900. The input unit 120 provides input to the central processing unit 100. The input unit 120 is, for example, a key or a touch input device. The camera 150 is used to take image data and to provide the taken image data to the central processing unit 100, for use in a conventional manner, such as storage, and transmission, etc.

The power supply 170 is used to supply electric power to the terminal equipment 900. The display 160 is used to display the display objects, such as images and characters. The display may be, for example, an LCD display, but it is not limited thereto.

The memory 140 is coupled to the central processing unit 100. The memory 140 may be a solid-state memory, such as a read-only memory (ROM), a random access memory (RAM), and a SIM card, etc. It may also be a memory such that it stores information when the power is interrupted, may be optionally erased and be provided with more data. Examples of such a memory are sometimes referred to as an EPROM, etc. The memory 140 may also be certain other types of devices. The memory 140 includes a buffer memory 141 (sometimes referred to as a buffer). The memory 140 may include an application/function storing portion 142 used to store application programs and function programs, or to execute the flow of the operation of the terminal equipment 900 via the central processing unit 100.

The memory 140 may further include a data storing portion 143 used to store data, such as a contact person, digital data, pictures, voices and/or any other data used by the terminal equipment 900. A driver storing portion 144 of the memory 140 may include various types of drivers of the terminal equipment 900 for the communication function and/or for executing other functions (such as application of message transmission, and application of directory, etc.) of the terminal equipment 900.

The communication module 110 is a transmitter/receiver 110 transmitting and receiving signals via an antenna 111. The communication module (transmitter/receiver) 110 is coupled to the central processing unit 100 to provide input signals and receive output signals, this being similar to the case in a conventional mobile phone.

A plurality of communication modules 110 may be provided in the same electronic apparatus for various communication technologies, such a cellular network module, a Bluetooth module, and/or wireless local network module, etc. The communication module (transmitter/receiver) 110 is also coupled to a loudspeaker 131 and a microphone 132 via the audio processing unit 130, for providing audio output via the loudspeaker 131 and receiving the audio input from the microphone 132, thereby achieving common telecommunications functions. The audio processing unit 130 may include any appropriate buffers, decoders, and amplifiers, etc. The audio processing unit 130 is further coupled to the central processing unit 100, thereby enabling the recording of voices in this device via the microphone 132 and playing the voices stored in this device via the loudspeaker 131.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present invention include other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although a particular feature of the present invention is described with respect to only one or more of the illustrated embodiments, such a feature may be combined with one or more other features of other embodiments as desired and in consideration of advantageous aspects of any given or particular application.

The invention claimed is:

1. An apparatus for state detection, applicable to terminal equipment having a first cover and a second cover, the apparatus for state detection comprising:
   capacitive touch sensors arranged in the first cover of the terminal equipment;
   a metal structure arranged in and movable with the second cover of the terminal equipment and grounded;
   wherein the metal structure is positioned above the capacitive touch sensors when the second cover is closed relative to the first cover,
      wherein the capacitive touch sensors are configured to be triggered by the metal structure to cause a change in the capacitance of the capacitive touch sensors; and
   a state determiner configured to determine that the second cover is opened or closed relative to the first cover according to the changed capacitance of the capacitive touch sensors.

2. The apparatus for state detection according to claim 1, wherein the terminal equipment is a slide-type mobile terminal, and the capacitive touch sensors are arranged at the upper side of the first cover.

3. The apparatus for state detection according to claim 1, wherein the terminal equipment is a clamshell-type mobile terminal, and the capacitive touch sensors are arranged at the lower side of the first cover.

4. The apparatus for state detection applicable to terminal equipment having a first cover and a second cover, the apparatus for state detection comprising:
   capacitive touch sensors arranged in the first cover of the terminal equipment;
      a metal structure arranged in the second cover of the terminal equipment and grounded, wherein the capacitive touch sensors are configured to be triggered by the metal structure to cause a change in the capacitance of the capacitive touch sensors; and
   a state determiner configured to determine that the second cover is opened or closed relative to the first cover according to the changed capacitance of the capacitive touch sensors;
      wherein the metal structure is positioned above the capacitive touch sensors when the second cover is closed relative to the first cover; or
      the metal structure is positioned above the capacitive touch sensors when the second cover is opened relative to the first cover.

5. The apparatus for state detection according to claim 1, wherein the apparatus for state detection further comprises:
   touch keys arranged on the surface of the first cover and connected to the capacitive touch sensors, the capacitive touch sensors being triggered by the contact of the touch keys and the metal structure, such that the capacitance of the capacitive touch sensors is changed.

6. The apparatus for state detection according to claim 5, wherein the touch keys and the capacitive touch sensors are multiple, and the touch keys are spaced at intervals on the surface of the first cover.

7. Terminal equipment, comprising the apparatus for state detection as claimed in claim 1.

8. A method for state detection, applicable to terminal equipment having a first cover and a second cover, the method for state detection comprising:

a cover moving step: moving the second cover of the terminal equipment relative to the first cover, wherein capacitive touch sensors are arranged in the first cover, and a grounded metal structure is arranged in and movable with the second cover;

wherein the metal structure is positioned above the capacitive touch sensors when the second cover is closed relative to the first cover, a capacitance changing step: triggering the capacitive touch sensors by the metal structure, such that the capacitance of the capacitive touch sensors is changed; and a state determining step: determining that the second cover is opened or closed relative to the first cover according to the changed capacitance of the capacitive touch sensors.

9. The method for state detection according to claim 8, wherein the capacitance changing step comprises: triggering the capacitive touch sensors by the contact of touch keys arranged on the surface of the first cover and the metal structure, such that the capacitance of the capacitive touch sensors is changed.

10. The method for state detection according to claim 9, wherein the touch keys and the capacitive touch sensors are multiple, and the touch keys are spaced at intervals on the surface of the first cover; and the state determining step comprises: determining that the second cover is opened or closed relative to the first cover when part or all of the touch keys are in contact with the metal structure.

11. The apparatus for state detection applicable to terminal equipment having a first cover and a second cover, the apparatus for state detection comprising:

capacitive touch sensors arranged in the first cover of the terminal equipment;

a metal structure arranged in the second cover of the terminal equipment and grounded, wherein the capacitive touch sensors are configured to be triggered by the metal structure to cause a change in the capacitance of the capacitive touch sensors; and a state determiner configured to determine that the second cover is opened or closed relative to the first cover according to the changed capacitance of the capacitive touch sensors;

wherein the terminal equipment is a slide-type mobile terminal, and the capacitive touch sensors are arranged at the upper side of the first cover;

wherein the metal structure is
positioned above the capacitive touch sensors when the second cover is closed relative to the first cover; or
the metal structure is positioned above the capacitive touch sensors when the second cover is opened relative to the first cover.

12. The apparatus for state detection applicable to terminal equipment having a first cover and a second cover, the apparatus for state detection comprising:

capacitive touch sensors arranged in the first cover of the terminal equipment;

a metal structure arranged in the second cover of the terminal equipment and grounded, wherein the capacitive touch sensors are configured to be triggered by the metal structure to cause a change in the capacitance of the capacitive touch sensors; and a state determiner configured to determine that the second cover is opened or closed relative to the first cover according to the changed capacitance of the capacitive touch sensors;

wherein the terminal equipment is a clamshell-type mobile terminal, and the capacitive touch sensors are arranged at the lower side of the first cover;

wherein the metal structure is positioned above the capacitive touch sensors when the second cover is closed relative to the first cover; or the metal structure is positioned above the capacitive touch sensors when the second cover is opened relative to the first cover.

13. The apparatus for state detection according to claim 2, wherein the apparatus for state detection further comprises:

touch keys arranged on the surface of the first cover and connected to the capacitive touch sensors, the capacitive touch sensors being triggered by the contact of the touch keys and the metal structure, such that the capacitance of the capacitive touch sensors is changed.

14. The apparatus for state detection according to claim 3, wherein the apparatus for state detection further comprises:

touch keys arranged on the surface of the first cover and connected to the capacitive touch sensors, the capacitive touch sensors being triggered by the contact of the touch keys and the metal structure, such that the capacitance of the capacitive touch sensors is changed.

15. The apparatus for state detection according to claim 13, wherein the touch keys and the capacitive touch sensors are multiple, and the touch keys are spaced at intervals on the surface of the first cover.

16. The apparatus for state detection according to claim 14, wherein the touch keys and the capacitive touch sensors are multiple, and the touch keys are spaced at intervals on the surface of the first cover.

17. Terminal equipment, comprising the apparatus for state detection as claimed in claim 2.

18. Terminal equipment, comprising the apparatus for state detection as claimed in claim 3.

19. Terminal equipment, comprising the apparatus for state detection as claimed in claim 4.

20. Terminal equipment, comprising the apparatus for state detection as claimed in claim 5.

* * * * *